United States Patent
Yang et al.

(10) Patent No.: US 7,889,703 B2
(45) Date of Patent: Feb. 15, 2011

(54) ADAPTIVE MODULATION AND CODING METHOD

(75) Inventors: Sung-Kang Yang, Taoyuan (TW); Ta-Sung Lee, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 699 days.

(21) Appl. No.: 11/273,144

(22) Filed: Nov. 14, 2005

(65) Prior Publication Data
US 2007/0110002 A1      May 17, 2007

(51) Int. Cl.
*H04B 7/216* (2006.01)
(52) U.S. Cl. .................. 370/335; 370/204; 370/205; 370/212; 370/230; 370/232; 370/395.21
(58) Field of Classification Search .............. 370/204, 370/205, 212
See application file for complete search history.

(56) References Cited

U.S. PATENT DOCUMENTS

| | | | | |
|---|---|---|---|---|
| 6,012,161 A * | 1/2000 | Ariyavisitakul et al. | ..... | 714/795 |
| 6,631,127 B1 * | 10/2003 | Ahmed et al. | ............... | 370/349 |
| 2003/0118031 A1 * | 6/2003 | Classon et al. | ......... | 370/395.54 |
| 2007/0076810 A1 * | 4/2007 | Herrera et al. | .............. | 375/261 |

FOREIGN PATENT DOCUMENTS

TW      200302642      8/2003

OTHER PUBLICATIONS

Liu et al., "Cross-layer modeling of adaptive wireless links for QoS support in multimedia networks," Oct. 2004, Proceedings of the First International Conference on Quality of Service in Heterogeneous Wired/Wireless Networks, pp. 68-75, IEEE Computer Society.*
Liu et al., "Cross-layer modeling of adaptive modulation and coding with truncated ARQ over wireless links," Sep. 2004, IEEE transactions on wireless communications, vol. 3, No. 5, pp. 1746-1755, IEEE Computer Society.*
English abstract of TW200302642, pub. Aug. 1, 2003.

* cited by examiner

*Primary Examiner*—Daniel J Ryman
*Assistant Examiner*—Jae Y Lee
(74) *Attorney, Agent, or Firm*—Thomas, Kayden, Horstemeyer & Risley

(57) ABSTRACT

An adaptive modulation and coding (AMC) method for data transmission by various modulation orders and coding rates is provided. A signal-to-noise ratio (SNR) of a transmission channel is estimated. Quality of service (QOS) parameters are provided, defining maximum allowable delay and packet error rate (PER). A retransmission limit is determined from the maximum allowable delay. An optimum packet length is determined based on the QOS parameters and the SNR. A modulation order and a coding rate most suitable for the estimated SNR and the defined PER are selected based on the optimum packet length and the retransmission limit.

7 Claims, 5 Drawing Sheets

ADAPTIVE MODULATION AND CODING METHOD

BACKGROUND

The invention relates to adaptive modulation and coding (AMC), and in particular, to a cross layer AMC method combining media access control (MAC) and physical (PHY) layers to enhance system performance.

AMC provides the flexibility to match the modulation-coding scheme to the average channel conditions for each user. With AMC, the power of the transmitted signal is held constant over a frame interval, and the modulation and coding rate is changed to match the current received signal quality or channel conditions. Different order modulations allow transition of more bits per symbol, thus, higher throughputs and better spectral efficiencies are provided. When using a modulation technique such as QAM64, however, better signal-to-noise ratios (SNRs) are needed to overcome any interference and maintain a certain bit error ratio (BER). The use of adaptive modulation allows a wireless system to choose the highest order modulation depending on the channel conditions, as range increases, to step down to lower modulations. Conversely, a closer target can utilize higher order modulations such as QAM for increased throughput. Additionally, adaptive modulation allows the system to overcome fading and other interference.

FIG. 1 shows the environment for adaptive modulation and coding (AMC) scheme. In a system with AMC, users close to the transmitter 100 are typically assigned higher order modulation with higher coding rates (e.g. QAM64 with R=3/4 turbo codes), but the modulation-order and/or coding rate will decrease as the distance from the transmitter increases, such as QAM16, QPSK and BPSK.

The implementation of AMC offers several challenges. AMC is sensitive to measurement error and delay. In order to select the appropriate modulation, the scheduler must be aware of the channel quality. Errors in the channel estimate will cause the scheduler to select the wrong data rate or transmit at too high a power, wasting system capacity, or too low a power, raising the block error rate. Delay in reporting channel measurements also reduces the reliability of the channel quality estimate due to the constantly varying mobile channel. Changes in the interference also add to the measurement errors.

SUMMARY

An exemplary embodiment of an adaptive modulation and coding (AMC) method for data transmission by various modulation orders and coding rates is provided. A signal-to-noise ratio (SNR) of a transmission channel is estimated. Quality of service (QOS) parameters are provided, defining maximum allowable delay and packet error rate (PER). A retransmission limit is determined from the maximum allowable delay. An optimum packet length is determined based on the QOS parameters and the SNR. A modulation order and a coding rate most suitable for the estimated SNR and the defined PER are selected based on the optimum packet length and the retransmission limit.

A MAC layer packet can be formed with the optimum packet length, and a physical layer frame comprising the MAC layer packet can be formed based on the selected modulation order and the coding rate.

The coding rate is utilized in a forward error correction algorithm conforming to the Reed-Solomon or LDPC standard. The modulation order is one of the BPSK, QPSK, QAM16 and QAM64 modulation standards.

Optimum relationships between SNR and PER for each modulation order may be predetermined. A threshold table can therefore be established by substituting the defined PER into the optimum relationships, in which a plurality of sections are generated each defining a SNR range corresponding to a modulation order and a coding rate. The modulation order and coding rate selection is performed by searching the threshold table.

DESCRIPTION OF THE DRAWINGS

The following detailed description, given by way of example and not intended to limit the invention solely to the embodiments described herein, will best be understood in conjunction with the accompanying drawings, in which.

DESCRIPTION

A detailed description of the invention is provided in the following.

Figure 1:
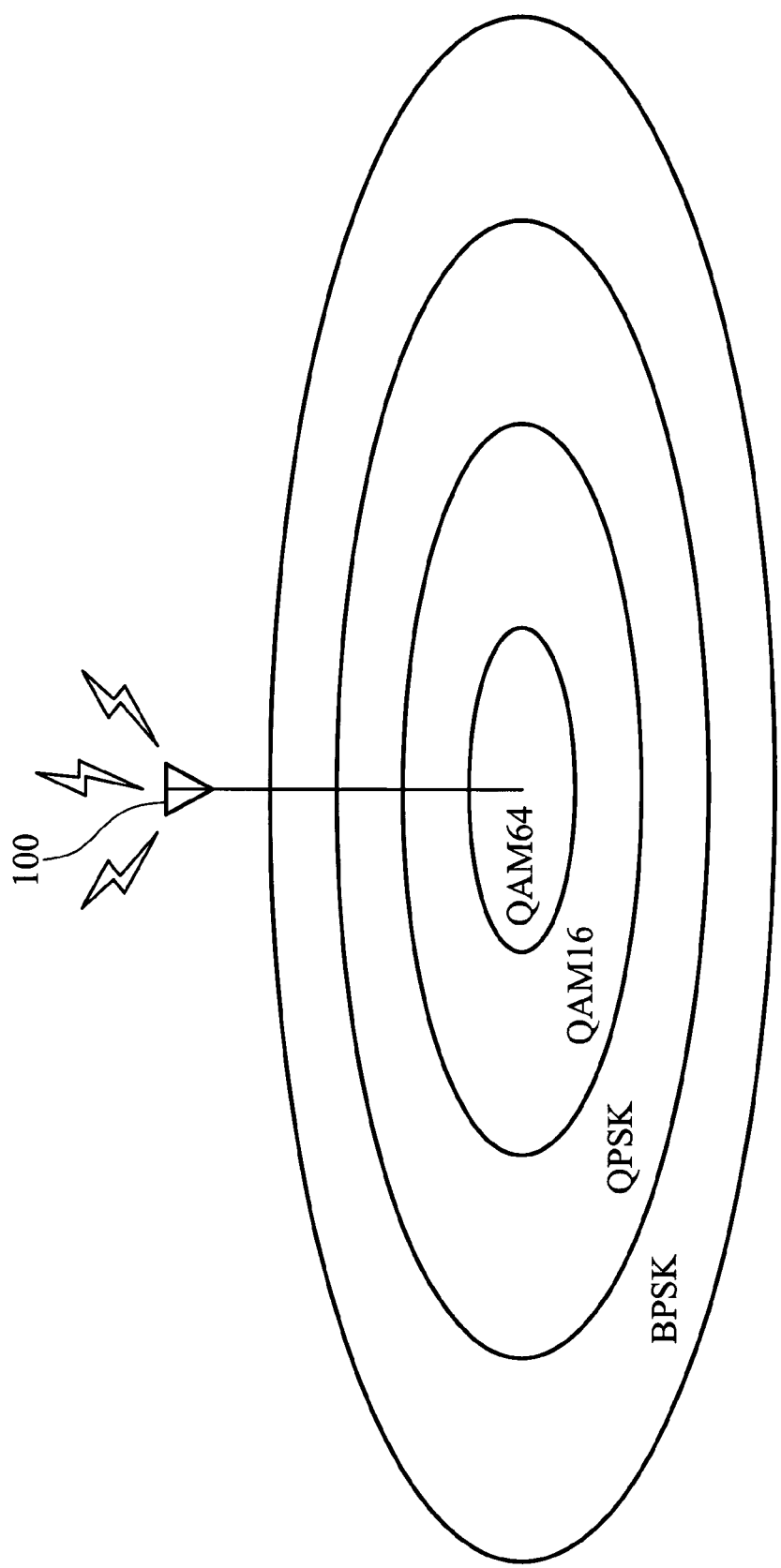
FIG. 1 shows the environment for adaptive modulation and coding (AMC) scheme.
Figure 2:
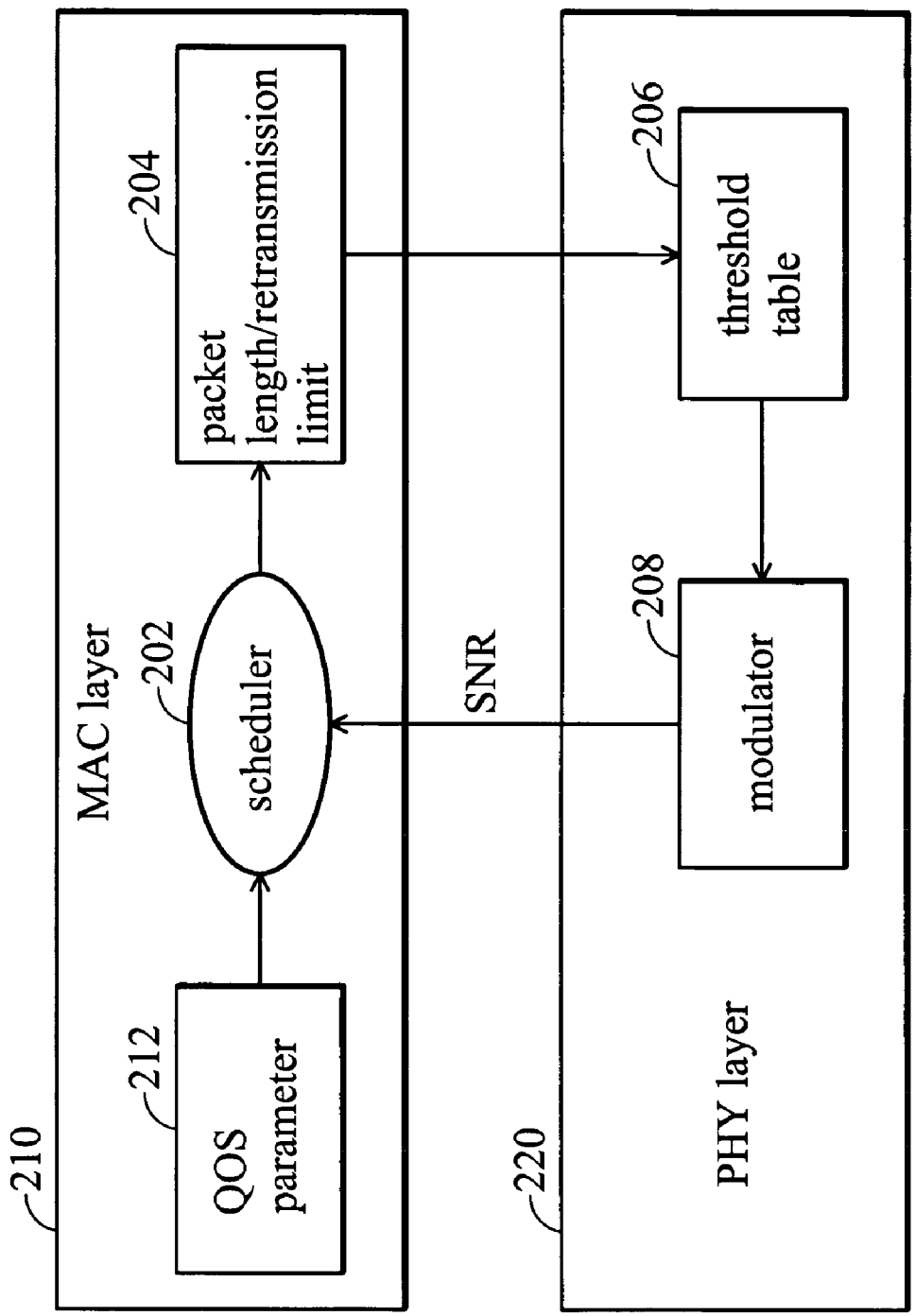
FIG. 2 shows an embodiment of the cross layer AMC procedure.

FIG. 2 shows an embodiment of the cross layer AMC procedure. Typically, a plurality of MAC layer packets are formed in the MAC layer 210 and packed in a physical layer 220 for transmission. In the MAC layer 210, a QOS parameter 212 defines various essential conditions to form the MAC layer packet. For example, requirements for maximum allowable delay, throughput, bit error rate (BER), and packet error rate (PER) are defined in the QOS parameter 212. A signal-to-noise ratio (SNR) of a transmission channel is estimated and input to a scheduler 202, and an optimal packet length and retransmission limit 204 are calculated in the MAC layer.

A retransmission limit can be determined by equating the worst-case delay to the maximum allowable delay, where the worst-case delay is $(R+1)$ $(T_{DATA}+T_{ACK}+2T_{SIFS})$, and the maximum allowable delay D can be given by:

$$D=(R+1)(T_{DATA}+T_{ACK}+2T_{SIFS}) \quad (1)$$

Where R is the retransmission limit, and $T_{DATA}$, $T_{ACK}$ and $T_{SIFS}$ are transmission time for data, acknowledge (ACK) packets and short inter frame space (SIFS) intervals according to the IEEE 802.11 standard. For an N channel decoder, the maximum buffer delay is N×D. Assume a frame size of 2000 bytes with R equal to 5, the maximum allowable delay D is 6.876 milliseconds when utilizing QAM64 modulation. The value is within acceptable ranges for non-interactive video streaming applications, which is between 1 to 10 milliseconds.

In the scheduler 202, the packet length and retransmission limit are calculated from the QOS parameters and the SNR, and are then sent to the physical layer 220 to form the physical layer frame. The packet length is determined by calculating maximum acceptable throughput under bounded PER requirements. Assume a packet with L bytes payload is transmitted, the probability of successful transmission is expressed as:

$$P_{OK}=(1-P_{err,data})(1-P_{err,ack}) \quad (2)$$

where $P_{OK}$ is the successful packet transmission probability, $P_{err,data}$ is data packet error probability, and $P_{err,ack}$ is ACK error probability. The total successful transmission within transmission limit R, $P_{succ}$, comprises $P_{OK}+P_{OK}(1-P_{OK})+P_{OK}(1-P_{OK})^2+\ldots P_{OK}(1-P_{OK})^{R-1}$.

The probability that a packet is successfully transmitted at the n-th transmission, among the total successful transmission, $P_{n|SUCC}$, can be expressed as:

$$[P_{OK}(1-P_{OK})^{n-1}]/P_{SUCC} \quad (3)$$

Therefore the average time taken for the $P_{n|SUCC}$ is:

$$T_{AV,SUCC} = P_{n|SUCC} \sum_{i=0}^{R}(iT_{bad,i}+T_{good,i}) \quad (4)$$

where $T_{bad,i}$ is the time taken for a failed cycle, and $T_{good,i}$ is the time taken for a successful cycle. Also the average time taken for a failed transmission can be derived as:

$$T_{AV,FAIL} = \sum_{i=0}^{R}(T_{bad,i}) \quad (5)$$

Thus, the average transmission cycle for the L bytes packet within transmission limit R is given by $$T_{AV} = \frac{1-P_{SUCC}}{P_{SUCC}}(T_{AV,SUCC}+T_{AV,FAIL}) \quad (6)$$

The effective throughput can then be calculated by:

$$\frac{8 \cdot L_a \cdot \frac{K}{N}}{T_{AV}} \quad (7)$$

where $L_a$ is the total data length required to transmit a packet, comprising the L bytes payload, cyclic redundancy check (CRC) codes, and forward error correction (FEC) codes. The K/N is coding rate. The constant 8 transfers the throughput from byte units to bit units. By substituting the worst case delay $(R+1)(T_{DATA}+T_{ACK}+2T_{SIFS})$ as the $T_{AV}$, the optimum packet length associated with the coding rate can be estimated.

In the physical layer, a modulator 208 selects a modulation order according to the information provided from the packet length and retransmission limit 204. Specifically, an optimal modulation order and coding rate most suitable for the estimated SNR and the defined PER are selected, based on the packet length and the retransmission limit determined by the scheduler 202. The coding rate is utilized in an error correction algorithm conforming Reed-Solomon or LDPC standard, and the modulation order is one of the BPSK, QPSK, QAM16 and QAM64 modulation standards.

In the physical layer, a threshold table 206 is established for modulation order selection. The threshold table 206 provides optimum relationships between SNR and PER for each modulation order. When receiving the defined PER from the packet length and retransmission limit 204, the threshold table 206 establishes a threshold table by substituting the defined PER into the optimum relationships, in which a plurality of sections are generated each defining a SNR range corresponding to a modulation order and a coding rate. The modulator 208 thus looks up the threshold table to determine which modulation order and coding rate to use.

Figure 3:
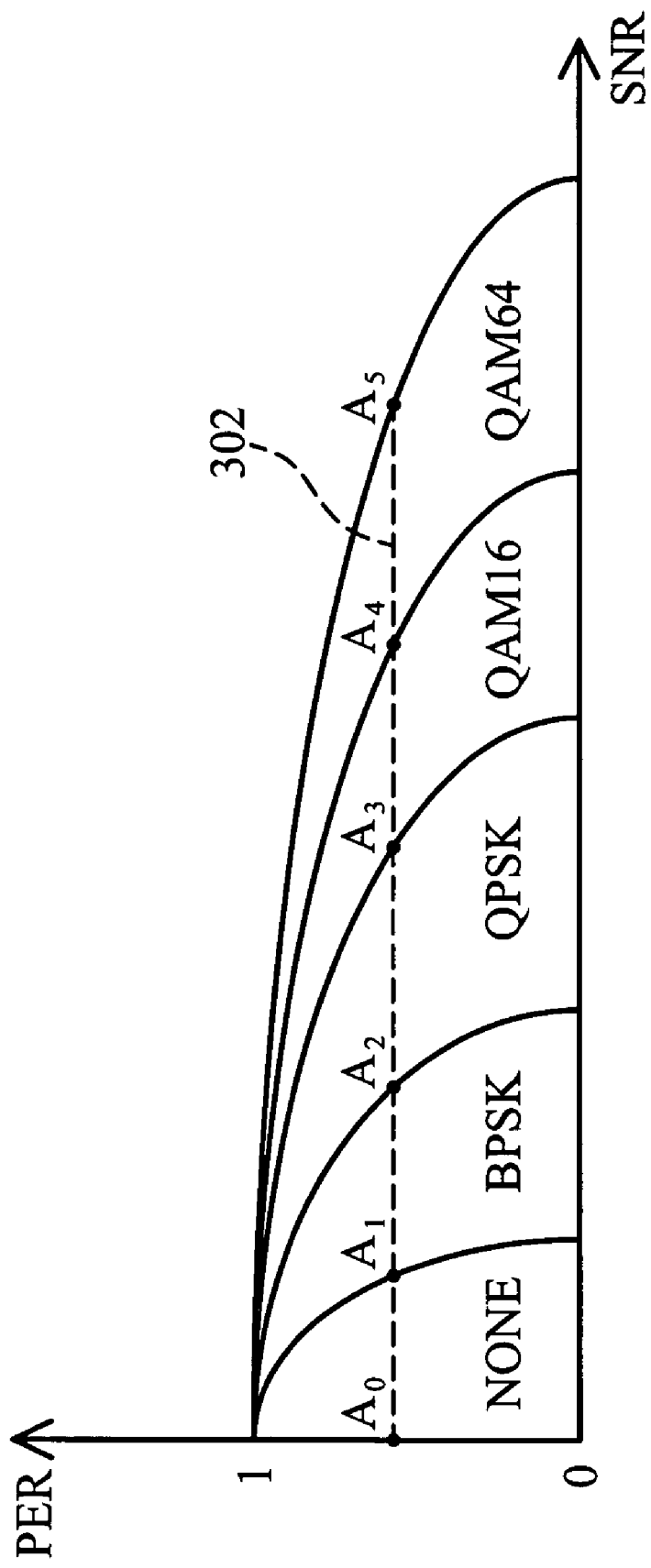
FIG. 3 shows a transition diagram of SNR versus PER.

FIG. 3 shows a transition diagram of SNR versus PER. The optimum relationships between SNR and PER for each modulation order, can be expressed in the form:

$$PER_n(\gamma)=1 \text{ if } 0<\gamma<\gamma_{pn}$$

$$PER_n(\gamma)=a_n\exp(-g_n\gamma) \text{ if } \gamma \geq \gamma_{pn}$$

where n is the mode index, a value associated with the modulation order and coding rate; $\gamma$ is the estimated SNR; and $a_n$, $g_n$ and $\gamma_{pn}$ are mode dependent constants. In FIG. 3, a plurality of curves are provided, driving the spaces into several sections each corresponding to a modulation order. When a desired PER is bounded, a PER line 302 intersects the plurality of curves to generate nodes $A_0$ to $A_5$. The nodes $A_0$ to $A_5$ represent SNR boundaries for each modulation order under a given PER, and thus, can also be referred to as a threshold table.

Figure 4:
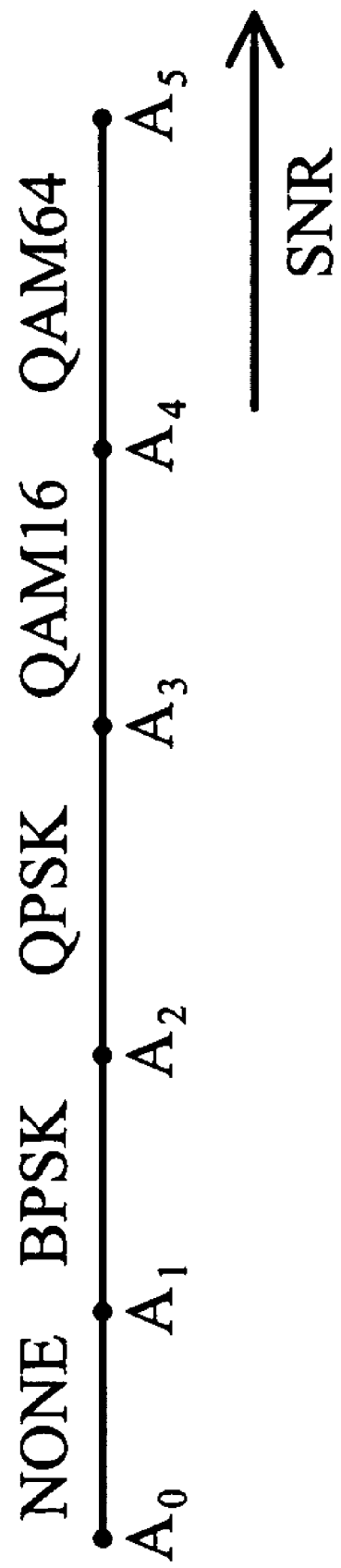
FIG. 4 is a threshold table corresponding to a given PER.

FIG. 4 is a threshold table corresponding to a given PER. When SNR is lower than $A_1$, the channel condition is inadequate for transmission, therefore no modulation and coding are performed. As the SNR increases, higher modulation orders are sequentially utilized, such as BPSK, QPSK, QAM16 and QAM64 respectively. Since the packet length, optimum modulation order and coding rate are functions of the SNR, information in the MAC layer 210 and physical layer 220 are combined to improve the throughput performance, and a threshold table is established to reduce the computational cost.

Figure 5:
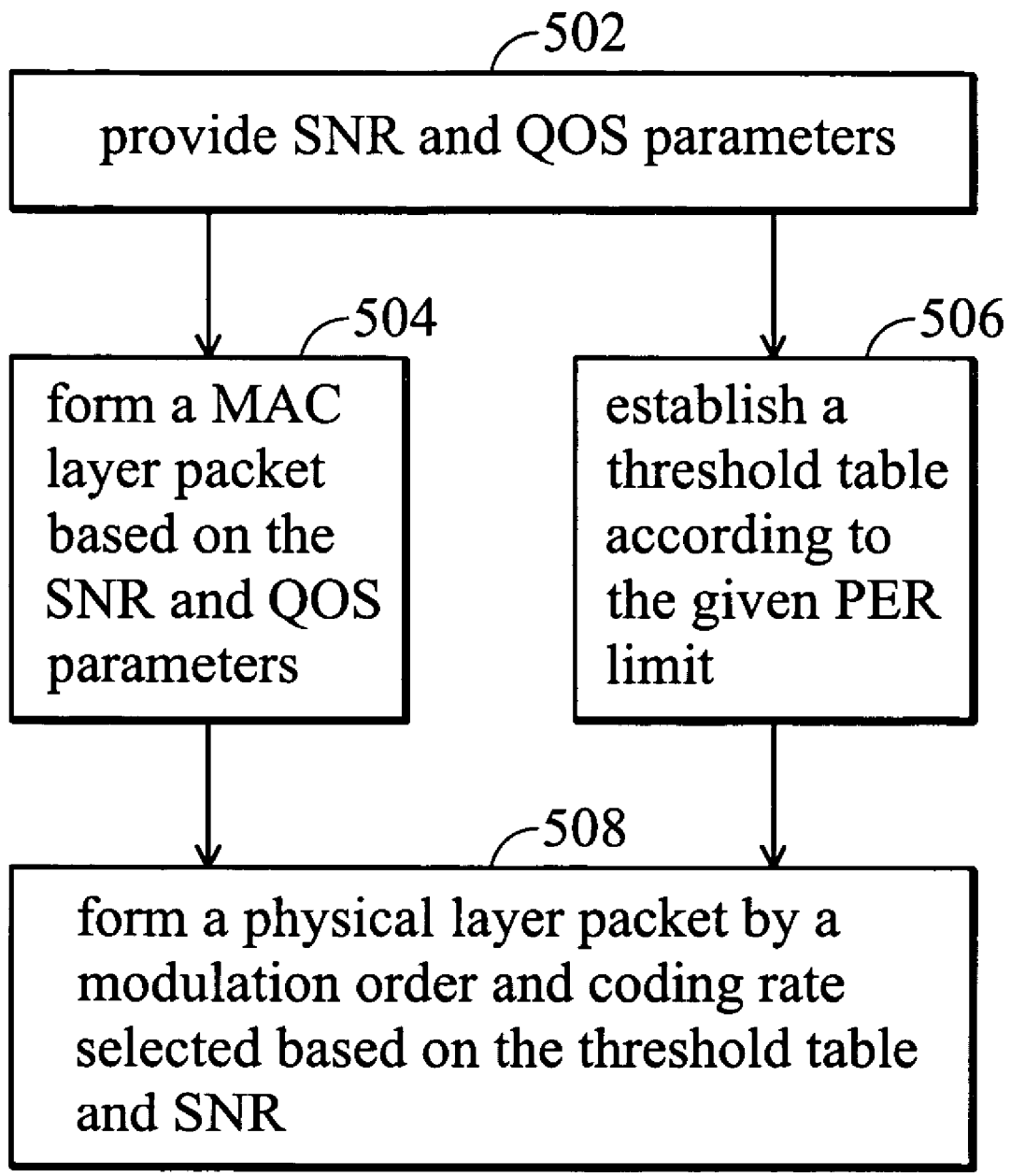
FIG. 5 is a flowchart of the cross layer AMC method.

FIG. 5 is a flowchart of the cross layer AMC method. The AMC method of the invention can be particularly utilized in IEEE 802.11 MIMO WLAN systems. In step 502, a signal-to-noise ratio (SNR) of a transmission channel is estimated. The channel estimation is known to people in the art. QOS parameters are provided to specify required performance, such as maximum allowable delay and packet error rate (PER). In step 504, since the packet length and retransmission limit are functions of the SNR and the maximum allowable delay, an optimum MAC layer packet can be formed based thereon to achieve the required performance. In step 506, a threshold table is established by substituting a given PER to a predetermined function as shown in FIG. 3. In step 508, a physical layer frame comprising the MAC layer packet is formed by a modulation order and coding rate selected based on the threshold table and SNR.

While the invention has been described by way of example and in terms of the preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An adaptive modulation and coding (AMC) method for data transmission by various modulation orders and coding rates, comprising:
   estimating a signal-to-noise ratio (SNR) of a transmission channel;
   providing quality of service (QOS) parameters defining maximum allowable delay and packet error rate (PER);
   determining a retransmission limit from the maximum allowable delay;
   determining an optimum packet length based on the QOS parameters and the SNR; and selecting a modulation order from a plurality of predetermined modulation orders and a coding rate from a plurality of predetermined code rates based on the optimum packet length and the retransmission limit, wherein the selected modulation order and the selected coding rate are most suitable for the estimated SNR and the defined PER.

2. The AMC method as claimed in claim 1, further comprising:
  forming a MAC layer packet with the optimum packet length;
  forming a physical layer frame comprising the MAC layer packet based on the selected modulation order and the coding rate.

3. The AMC method as claimed in claim 1, wherein the coding rate is utilized in a forward error correction algorithm conforming to the Reed-Solomon or Low Density Parity Check (LDPC) standard.

4. The AMC method as claimed in claim 1, wherein the modulation order is one of the BPSK, QPSK, QAM16 and QAM64 modulation standards.

5. The AMC method as claimed in claim 1, further comprising:
  deriving optimum relationships between SNR and PER for each of the plurality of predetermined modulation orders;
  establishing a threshold table by substituting the defined PER into the optimum relationships, in which a plurality of sections are generated each defining a SNR range corresponding to a modulation order and a coding rate, wherein
  the step of selection is performed by searching the threshold table.

6. The AMC method as claimed in claim 5, wherein the optimum packet length is determined by:
  deriving transmission successful probability within the retransmission limit from the PER;
  calculating an average transmission time consumed to complete a successful transmission based on the transmission successful probability within the retransmission limit;
  calculating an effective throughput from total payloads transmitted during the average transmission time; and
  determining the optimum packet length based on the effective throughput.

7. The AMC method as claimed in claim 5, wherein the optimum relationships between the SNR and PER are derived by an approximation function:

$PER_n(\gamma)=1$ if $0 \leq \gamma \leq \gamma_{pn}$ $PER_n(\gamma)=a_n \exp(-g_n \gamma)$ if $\gamma >= \gamma_{pn}$ where n is the mode index, a value associated with the modulation order and coding rate;
$\gamma$ is the estimated SNR; and
$a_n$, $g_n$ and $\gamma_{pn}$ are mode dependent constants.

* * * * *